United States Patent [19]

Imazaike

[11] Patent Number: 5,729,401
[45] Date of Patent: Mar. 17, 1998

[54] AUTOMATIC CASSETTE CHANGER INCLUDING SHIFTABLE DRIVEN ROLLERS FOR A FRONT LOADING TYPE MAGNETIC RECORDING-REPRODUCTION APPARATUS

[75] Inventor: Mikiharu Imazaike, Osaka, Japan

[73] Assignee: Imazaike Seiko Kabushiki Kaisha, Osaka-fu, Japan

[21] Appl. No.: 623,258

[22] Filed: Mar. 28, 1996

[30] Foreign Application Priority Data

Apr. 10, 1995 [JP] Japan .................... 7-084164

[51] Int. Cl.$^6$ .................................. G11B 15/68
[52] U.S. Cl. ........................................ 360/92
[58] Field of Search ................... 360/92, 93, 85, 360/69, 71

[56] References Cited

U.S. PATENT DOCUMENTS

| | | | |
|---|---|---|---|
| 4,780,775 | 10/1988 | Hirose et al. | 360/85 |
| 5,128,816 | 7/1992 | Imazaike | 360/92 |
| 5,402,285 | 3/1995 | Theobald, Jr. et al. | 360/92 |

FOREIGN PATENT DOCUMENTS

| | | | |
|---|---|---|---|
| 60-50740 | 3/1985 | Japan | 360/92 |
| 2-292772 | 12/1990 | Japan | 360/92 |
| 3-1360 | 1/1991 | Japan | |
| 4-23263 | 1/1992 | Japan | 360/92 |
| 4-216361 | 8/1992 | Japan | 360/92 |
| 5-144145 | 6/1993 | Japan | 360/92 |
| 5-307821 | 11/1993 | Japan | 360/92 |
| 6-290522 | 10/1994 | Japan | 360/92 |

*Primary Examiner*—Stuart S. Levy
*Assistant Examiner*—Kevin M. Watkins
*Attorney, Agent, or Firm*—Jordan and Hamburg

[57] ABSTRACT

A cassette changer is mountable on a magnetic recording-reproduction apparatus having a cassette inlet-outlet opening. The cassette changer includes a cassette shifter which shifts a new cassette from a stand-by position above the cassette inlet-outlet opening to an insertion position facing the cassette inlet-outlet opening, and a cassette mover which inserts and withdraws a cassette into and from the magnetic recording-reproduction apparatus through the cassette inlet-outlet opening. The cassette mover is provided with a pair of rollers on both sides of the cassette, a roller shifter which shifts the rollers between an operative position to come into contact with the sides of the cassette to insert and withdraw the cassette and an inoperative position displaced from the sides of the cassette to allow the cassette to be shifted by the cassette shifter; and a roller driver which drives the rollers in forward and backward directions to insert and withdraw the cassette.

19 Claims, 16 Drawing Sheets

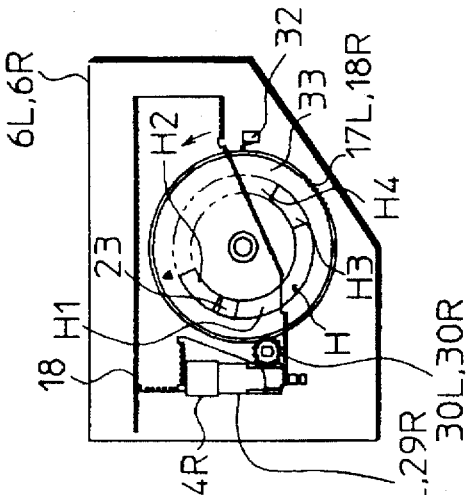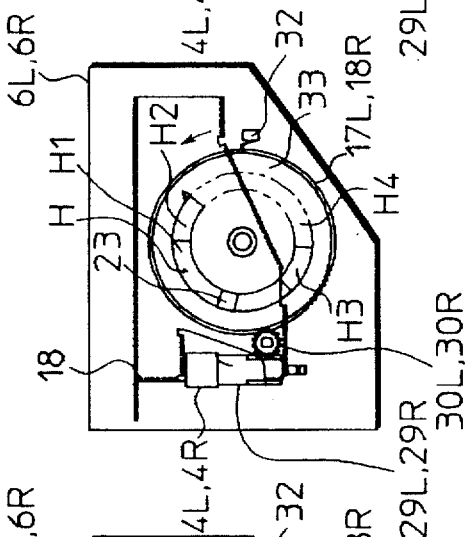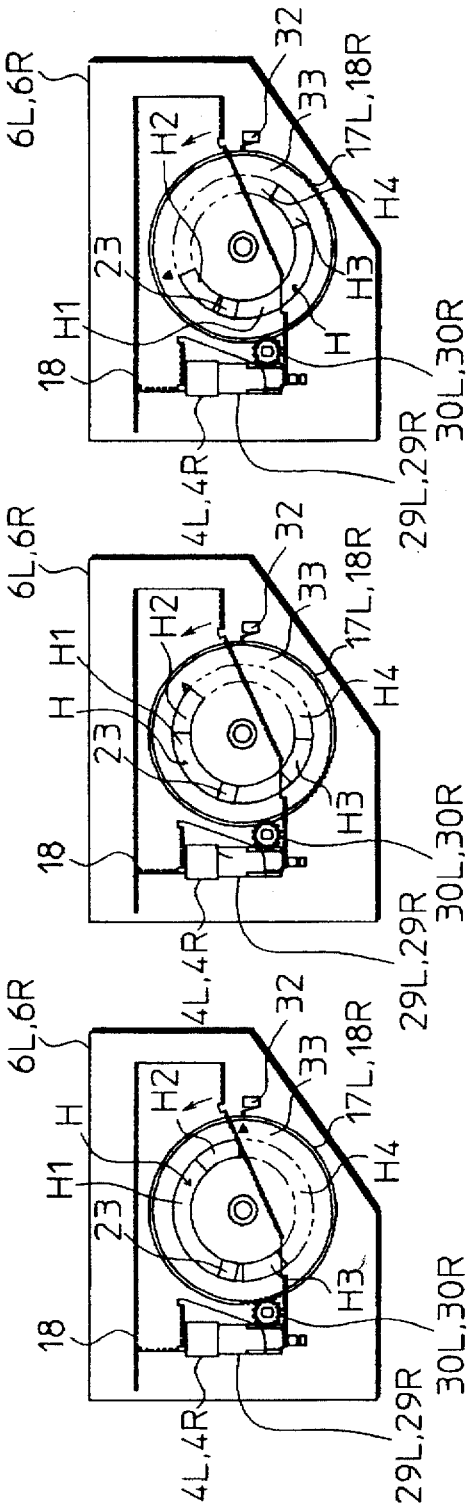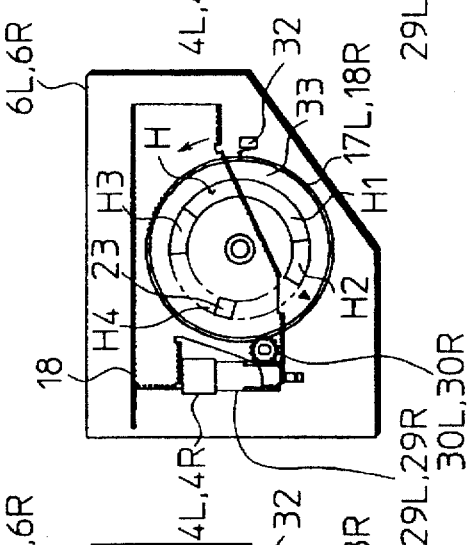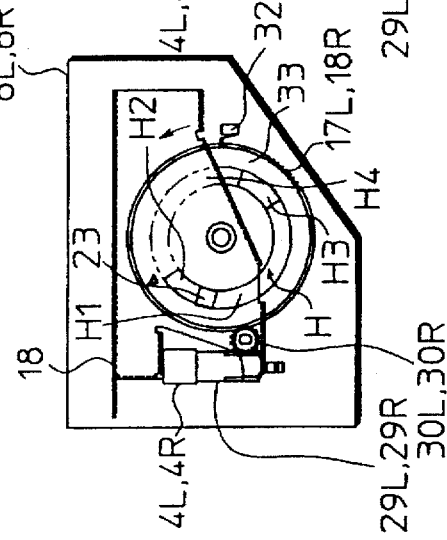

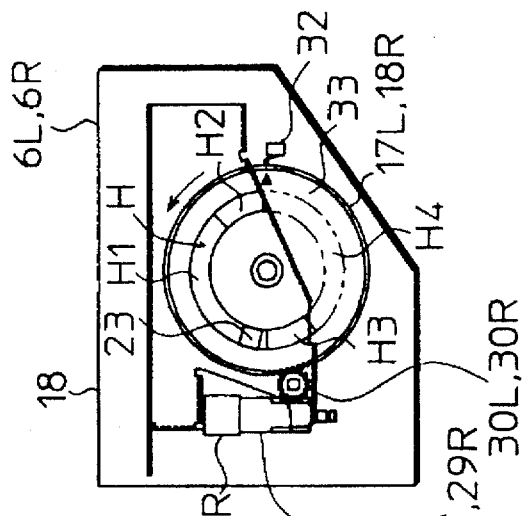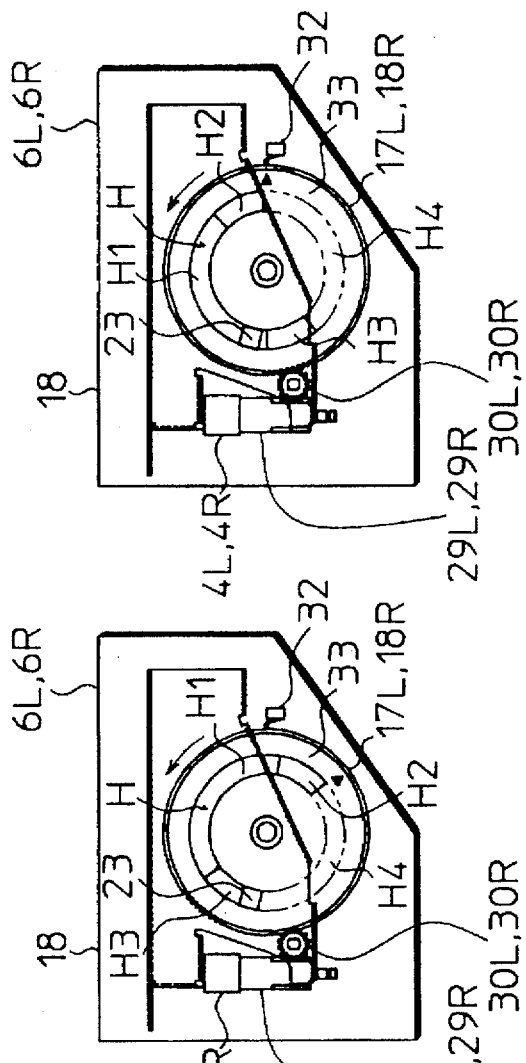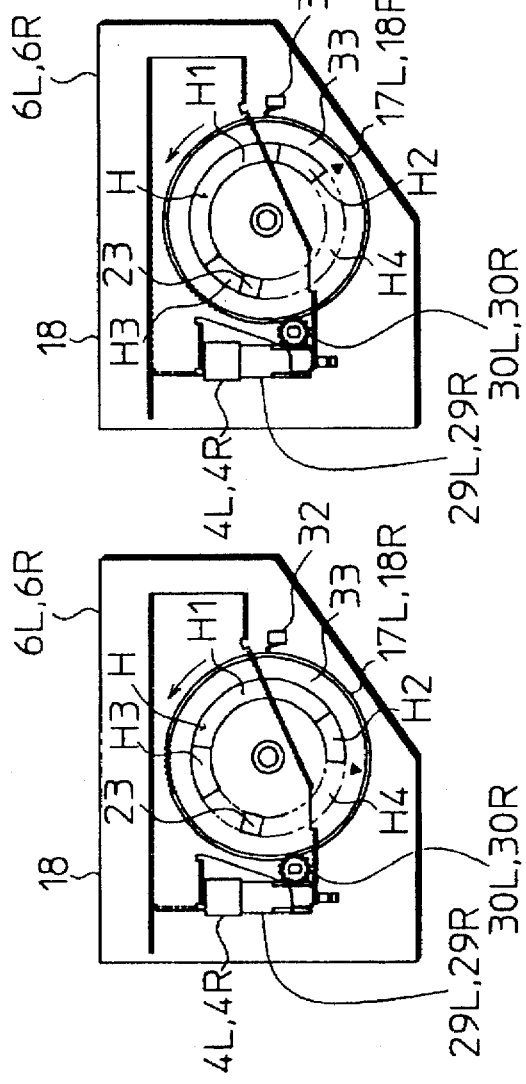

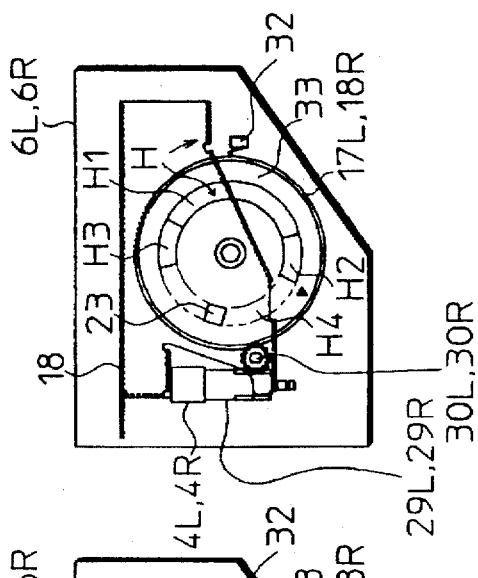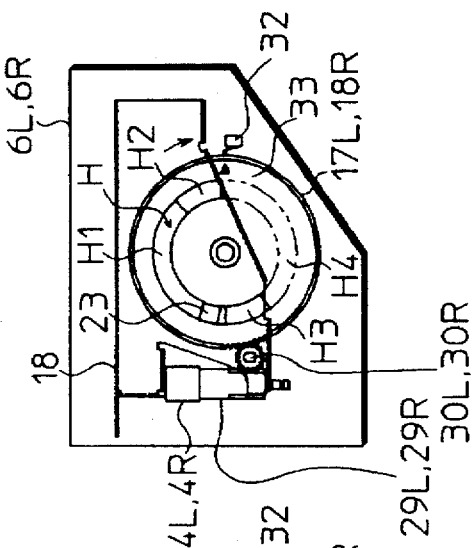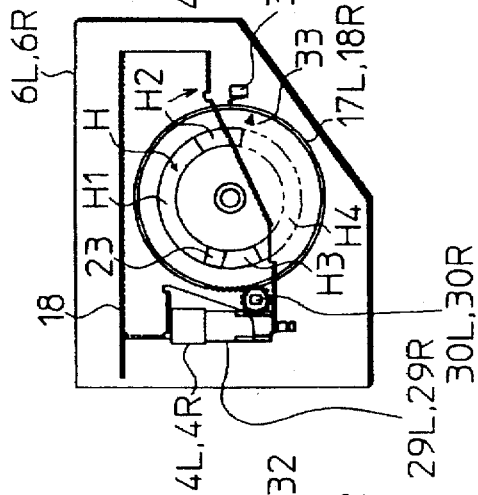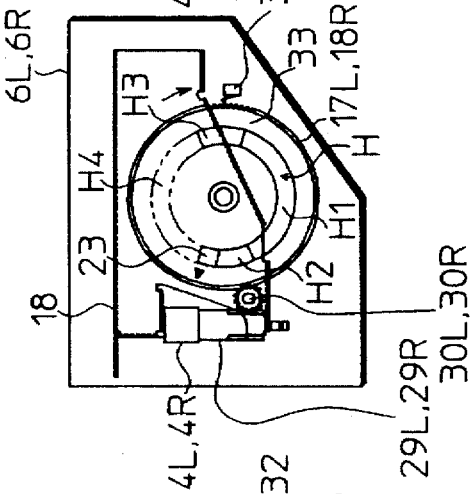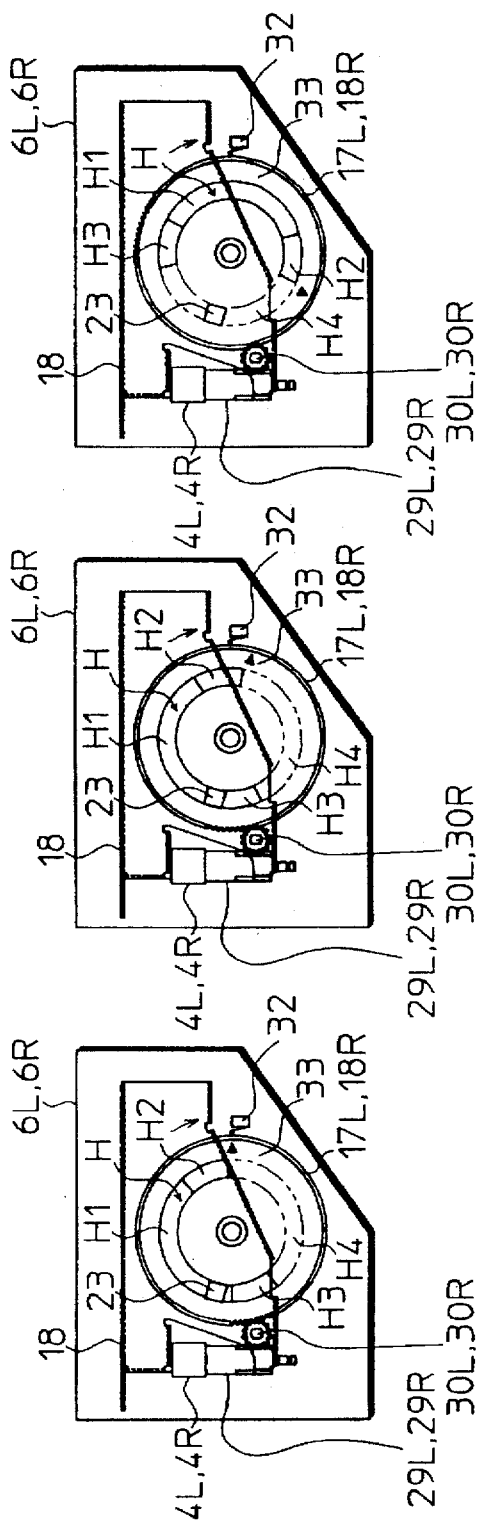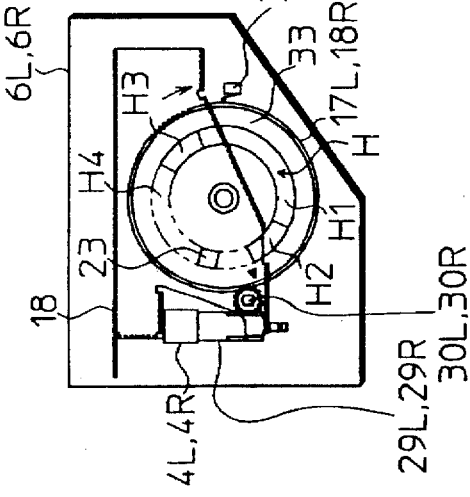

AUTOMATIC CASSETTE CHANGER INCLUDING SHIFTABLE DRIVEN ROLLERS FOR A FRONT LOADING TYPE MAGNETIC RECORDING-REPRODUCTION APPARATUS

BACKGROUND OF THE INVENTION

This invention relates to a cassette changer mountable in front of a magnetic recording-reproduction apparatus of the front loading type, such as video tape recorder (hereinafter referred to as a "VTR"), for automatically inserting and discharging video tape cassettes (hereinafter referred to as a "cassette") for dubbing and other processing.

Conventionally, there has been known a cassette changer disclosed in Japanese Unexamined Patent Publication No. 3-1360. The cassette changer comprises a cassette holding portion vertically movable between a cassette insertion position facing a cassette inlet-outlet opening of a VTR and a stand-by position located above the cassette insertion position, a pushing pawl horizontally movable in forward and rearward directions of the cassette changer, and a pair of discharge rollers arranged at right and left ends of a front portion of the cassette opening to be rotatable in forward and backward directions. The cassette changer is operated as follows. After the cassette holding portion carrying a cassette is moved downward, the pushing pawl forcibly pushes the cassette in the VTR through the cassette opening. After a specified process, e.g., recording and reproduction, is over, the cassette is ejected and discharged from the VTR by the discharge rollers.

The above-mentioned cassette changer has suffered the following problems.

Since the insertion and discharge of a cassette are performed individually by the pushing pawl and the discharge rollers, the structure required for these operations becomes complicated.

Particularly, since the pushing pawl as means for pressingly inserting the cassette is required to be reciprocally moved at a relatively long stroke, the mechanism for moving the pushing pawl makes the structure for the cassette inserting/discharging operations more complicated and larger, thereby increasing the manufacturing costs and weight of the cassette changer.

Since the pushing pawl is disposed in front of a cassette, the structure for the cassette inserting/discharging operations, i.e., the size of the cassette changer as a whole, particularly in the forward and rearward directions (depthwise direction) becomes large due to an extra space for the pushing pawl, which results in a larger and heavier cassette changer.

SUMMARY OF THE INVENTION

It is an object of the present invention is to provide a cassette changer which has overcome the problems residing in the prior art.

It is another object of the present invention to provide a cassette changer for use in a magnetic recording-reproduction apparatus which can realize a simplified and smaller structure for inserting and discharging a cassette.

The present invention is directed to a cassette changer mountable on a magnetic recording-reproduction apparatus having a cassette inlet-outlet opening, the cassette changer comprising: a cassette shifter which shifts a new cassette from a stand-by position above the cassette inlet-outlet opening to an insertion position facing the cassette inlet-outlet opening; a cassette mover which inserts and withdraws a cassette into and from the magnetic recording-reproduction apparatus through the cassette inlet-outlet opening, the cassette mover including: a pair of rollers provided on both sides of the cassette; a roller shifter which shifts the rollers between: an operative position to come into contact with the sides of the cassette to insert and withdraw the cassette and an inoperative position to stay away from the sides of the cassette to allow the cassette to be shifted by the cassette shifter; and a roller driver which drives the rollers in forward and backward directions to insert and withdraw the cassette.

The cassette shifter may be constructed by a cassette holder which holds a new cassette and a vertical moving mechanism which moves the cassette holder between an upper position corresponding to the stand-by position and a lower position corresponding to the insertion position.

The vertical moving mechanism may be provided with a cassette holder moving cam rotatable about a specified axis and a vertical movement converter which is cooperatively connected with the cassette holder moving cam and the cassette holder to convert a rotational force of the cassette holder moving cam to a force of moving the cassette holder in the vertical direction. The roller shifter may be provided with a roller shifting cam rotatable about a specified axis; a roller shifting converter which is cooperatively connected with the roller shifting cam and the rollers to convert a rotational force of the roller shifting cam to a force for shifting the rollers from the operative position to the inoperative position; and an urging device which urges the rollers to the operative position.

The cassette holder moving cam and the roller shifting cam may be preferably formed as one body. Further, the cassette holder moving cam and the roller shifting cam may be preferably formed back to back.

It may be appreciated that the cassette holder moving cam is formed in such a manner as to move the cassette holder from the upper position to the lower position and to the upper position again during one turn in the forward direction, while maintaining the cassette changer at the upper position during one turn in the backward direction; and the roller shifting cam is formed in such a manner as to shift the rollers from the inoperative position to the operative position and to the inoperative position again during one turn in the forward direction and the backward direction.

Further, the vertical movement converter may be formed with a cam follower portion. The cassette holder moving cam may be formed with: an outer circular groove which is operable to relatively move the cam follower portion and is formed along a circle whose center is at the cam axis; an inner groove which is operable to relatively move the cam follower portion and is formed along a substantial ellipse which is positioned in the circle and whose center is shifted from the cam axis, the inner groove partially joining the outer circular groove; and restricting means provided in the joining portion for restricting the relative movement of the cam follower portion in a route which advances from the outer groove to the inner groove and to the outer groove again during one turn in the forward direction and in a route which advances the outer groove during one turn in the backward direction.

The vertical movement converter may be provided with: a first arm member cooperatively connected with the cassette holder moving cam, the first arm member being rotatable on a vertical plane by the cassette holder moving cam; and a second arm member cooperatively connected with the cassette holder and the first arm member, the second arm member being rotatable on a vertical plane by the first arm member to thereby move the cassette holder up and down.

In the thus constructed cassette changer, insertion and withdrawal of a cassette are automatically performed in accordance with:

1) the shift of a new cassette to the insertion position;
2) the shift of the rollers to the operative position and the forward rotation of the rollers to insert the cassette;
3) the shift of the rollers to the inoperative position;
4) the shift of the rollers to the operative position and the backward rotation of the rollers to withdraw the cassette; and
5) the shift of the rollers to the inoperative position.

In this way, a cassette can be inserted into and withdrawn from the magnetic recording-reproduction apparatus by shifting and driving the pair of rollers only. Accordingly, comparing to the conventional cassette changer in which a cassette is inserted by pushing pawls and withdrawn by rollers, the cassette insertion and withdrawal construction can be remarkably simplified and reduced in size.

Further, the cassette moving rollers are shifted between the operative position and the inoperative position. In the operative position, immediately after the cassette goes away from the cassette moving rollers, the cassette moving rollers follow from both side surfaces of the cassette onto the rear surface, consequently pushing the cassette from the back. This will make it more reliable to transfer the cassette onto a loading mechanism provided in the recording-reproduction apparatus.

The cassette holder is moved in a vertical direction by the vertical moving mechanism. This will make it possible to arrange the cassette holder at a position closer to the front portion of the reproducing-reproduction apparatus, and arrange a reception space for receiving a discharged cassette below the cassette holder. Accordingly, cassettes can be inserted and withdrawn in a reduced space. Thus, the whole depthwise length of the cassette changer can be decreased to a favorable small size.

The combination of the cassette holder moving cam and the vertical movement converter and the combination of the roller shifting cam and the roller shifting converter will simplify the control of insertion and withdrawal of the cassette because the operational timing between the movement of the cassette holder and the rotation of the cassette moving rollers is controlled only by regulating the rotation of the two cams. Compared to the conventional cassette changer including a combination of a rack and a pinion, this construction provides a simpler control and reduces the change of malfunction.

The forming of the cassette holder moving cam and the roller shifting cam into one body will further simplify the construction of the cassette changer and also reduce the size, thus decreasing the production costs. Further, the one-body combination will provide a fixed timing between the cassette holder moving cam and the roller shifting cam, and thus increase the reliability for the insertion and withdrawal operations. Moreover, the back-to-back combination will assure a cam having a reduced diameter and thickness, thereby simplifying the production of the cassette holder moving cam and the roller shifting cam.

The insertion of a new cassette is completed by one turn of the cam in the forward direction and the withdrawal of a processed cassette is completed by one turn of the cam in the backward direction. In other words, the insertion and withdrawal can be accomplished by rotating the cam one turn in the forward or backward direction. Accordingly, this will eliminate a complicated sequence requiring detection of each operation, thus providing a simplified and reliable control for inserting and withdrawal of a cassette. Further, this construction requires no sensors other than a sensor to start replacement of a processed cassette with a new cassette, e.g., a sensor to detect the discharge of a processed cassette and a sensor to detect one turn of the cam, thus remarkably reducing the production costs.

The combination of the outer circular groove and the inner groove partially joining the outer circular groove will facilitate the production of the cam. Also, the restricting means can reliably change the relative movement of the cam follower portion of the vertical movement converter for the forward and backward rotations, thus reducing the chance of malfunction.

The combination of the first arm member cooperatively connected with the cassette holder moving cam and the second arm member cooperatively connected with the cassette holder and the first arm member will make it possible to reduce the diameter of the cam and provide a smaller-sized cassette changer.

BRIEF DESCRIPTION OF THE DRAWINGS

FIGS. 10A to 10I are diagrams of the roller shifting mechanism, FIG. 10A showing a state before the cassette is inserted, FIGS. 10B and 10C respectively showing initial states of the cassette insertion, FIGS. 10D to 10F respectively showing states in which the cassette has started to be inserted, has being inserted, and has just been inserted, FIGS. 10G and 10H showing a state immediately after the cassette has been inserted and, FIG. 10I showing a state in which the cassette has completely been inserted;

FIGS. 11A to 11F are diagrams of the roller shifting mechanism, FIG. 11A showing a state before the cassette is started to be discharged, FIG. 11B showing a state immediately after the cassette has started to be discharged and, FIG. 11C showing a state in which the cassette is being discharged, FIG. 11D showing a state in which the cassette has just been discharged, FIG. 11E showing a state immediately after the cassette has been discharged and, FIG. 11F showing a state in which the cassette has completely been discharged;

DETAILED DESCRIPTION OF THE PREFERRED EMBODIMENTS OF THE INVENTION

A cassette changer embodying the present invention will be described with reference to the accompanying drawings.

Figure 3:
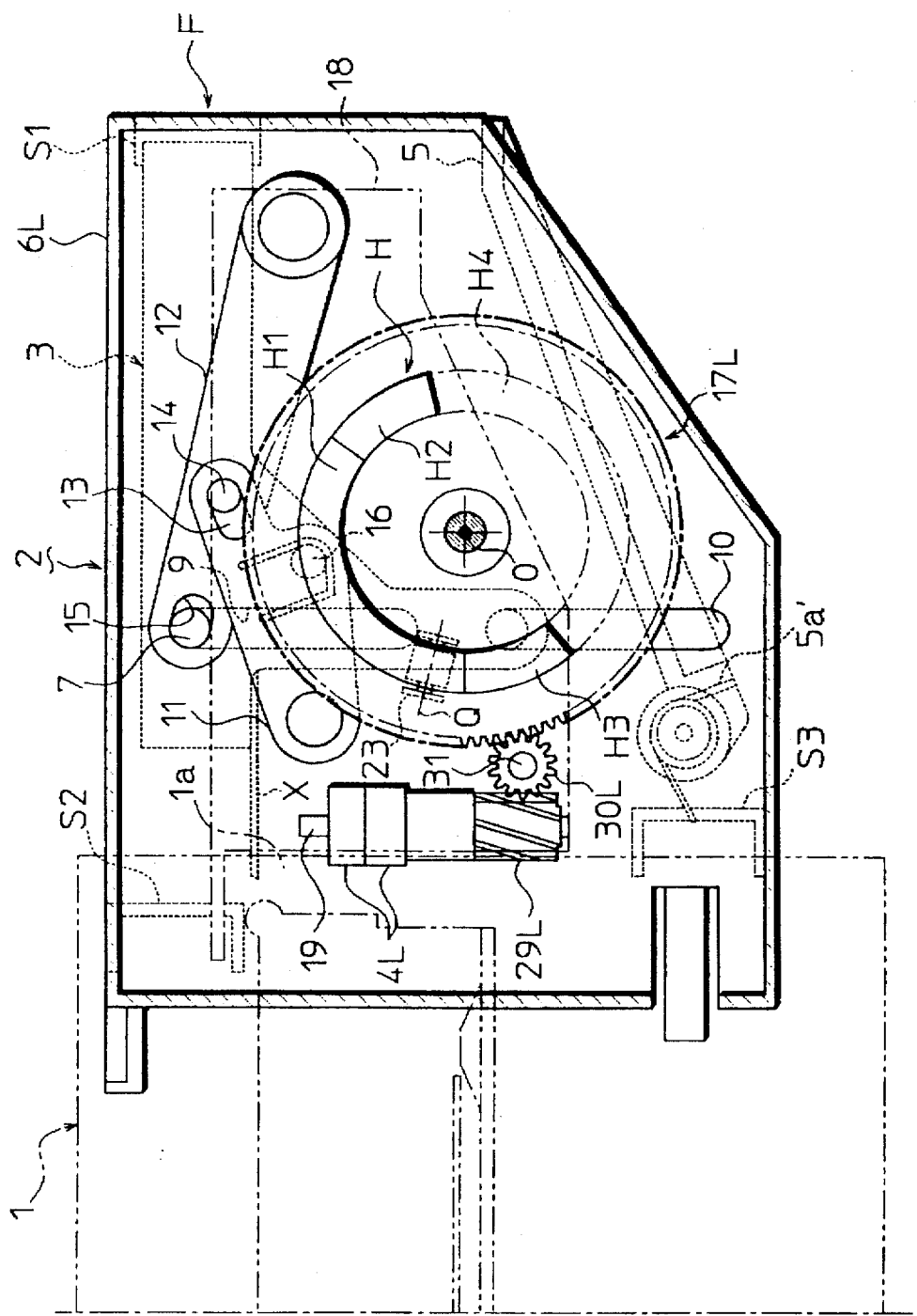
FIG. 3 is an enlarged cross sectional view taken along the line III—III in FIG. 2.
Figure 8:
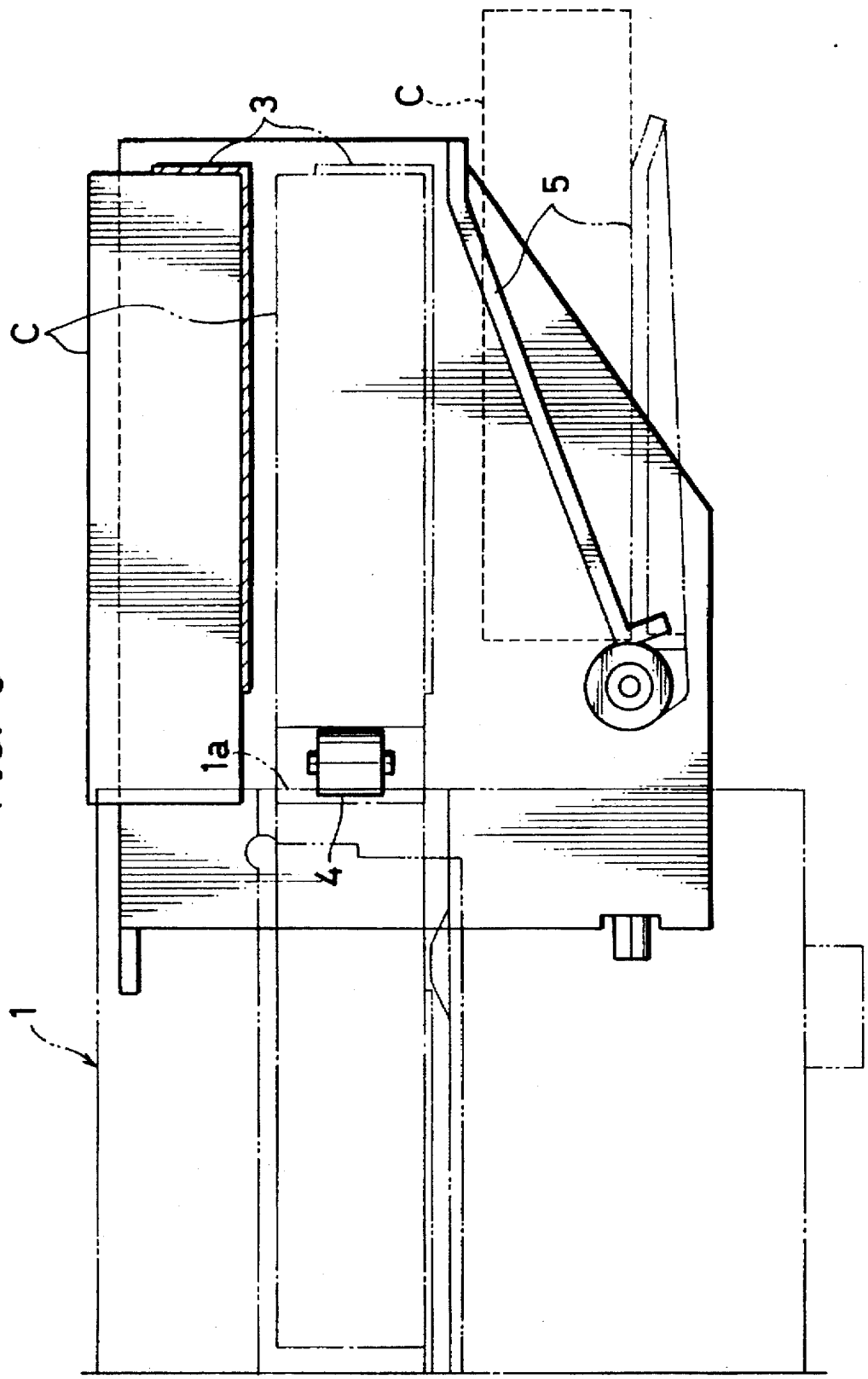
FIG. 8 is a schematic side view summarily showing a construction and operation of the cassette changer.

Indicated at 1 is a VTR (video tape recorder) of the front loading type having a cassette inlet-outlet opening 1a in front thereof (shown in FIGS. 3 and 8). A cassette inserted within the VTR 1 through the opening 1a is transported to a recording-reproduction position by a known loading mechanism (not shown ) within the VTR. After a specified process, e.g., recording or reproduction, is performed, the cassette is automatically ejected through the opening 1a. Hereinafter, a cassette for recording or reproduction is referred to as a "new cassette", while the recorded or reproduced cassette is referred to as a "processed cassette".

A cassette changer 2 according to this invention is mounted in front of the VTR 1. First, the construction and operation of the cassette changer 2 are described summarily with reference to FIG. 8.

A new cassette C is accommodated in a cassette holding portion 3 and retained in a stand-by position located above the cassette inlet-outlet opening 1a (the state shown by the solid lines in FIG. 8).

Thereafter, the cassette holding portion 3 carrying the cassette C thereon is lowered to shift the cassette C to an insertion position facing the cassette inlet-outlet opening 1a through which the cassette C is to be inserted (the state shown by the phantom lines in FIG. 8).

Then, the cassette C in the insertion position is forcibly pushed into the VTR 1 through the cassette inlet-outlet opening 1a by a pair of moving rollers 4 to be loaded by the loading mechanism (the state shown by the dashed lines in FIG. 8, i.e., insertion of the cassette).

After the specified process, e.g., recording or reproduction, is performed, the processed cassette C is ejected through the cassette inlet-outlet opening 1a, forcibly discharged outside the VTR by the pair of moving rollers 4, and received by cassette receivers 5, 5 (the state shown by the broken lines in FIG. 8, i.e., discharge of the cassette).

Figure 1:
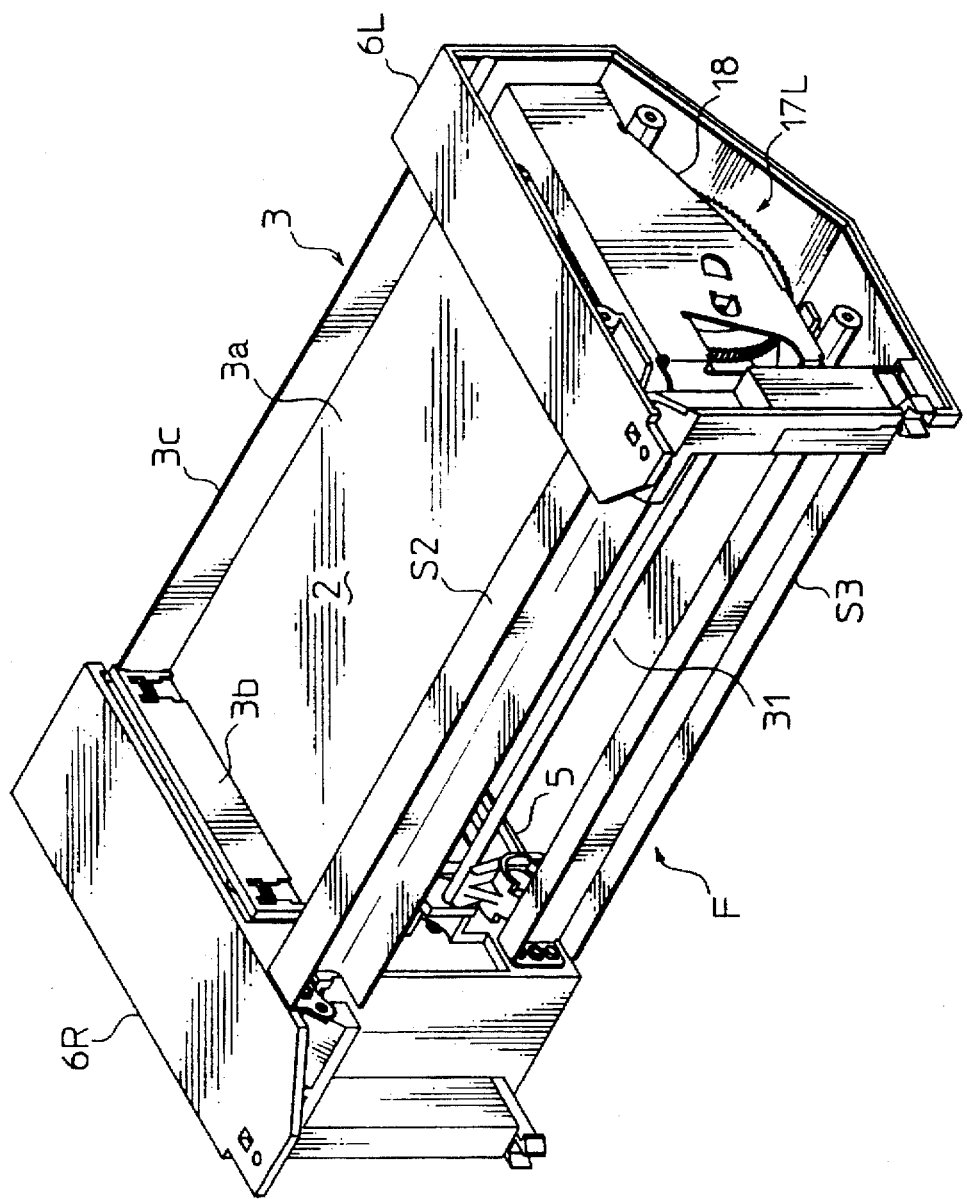
FIG. 1 is a perspective view showing an entire construction of a cassette changer embodying the present invention.
Figure 2:
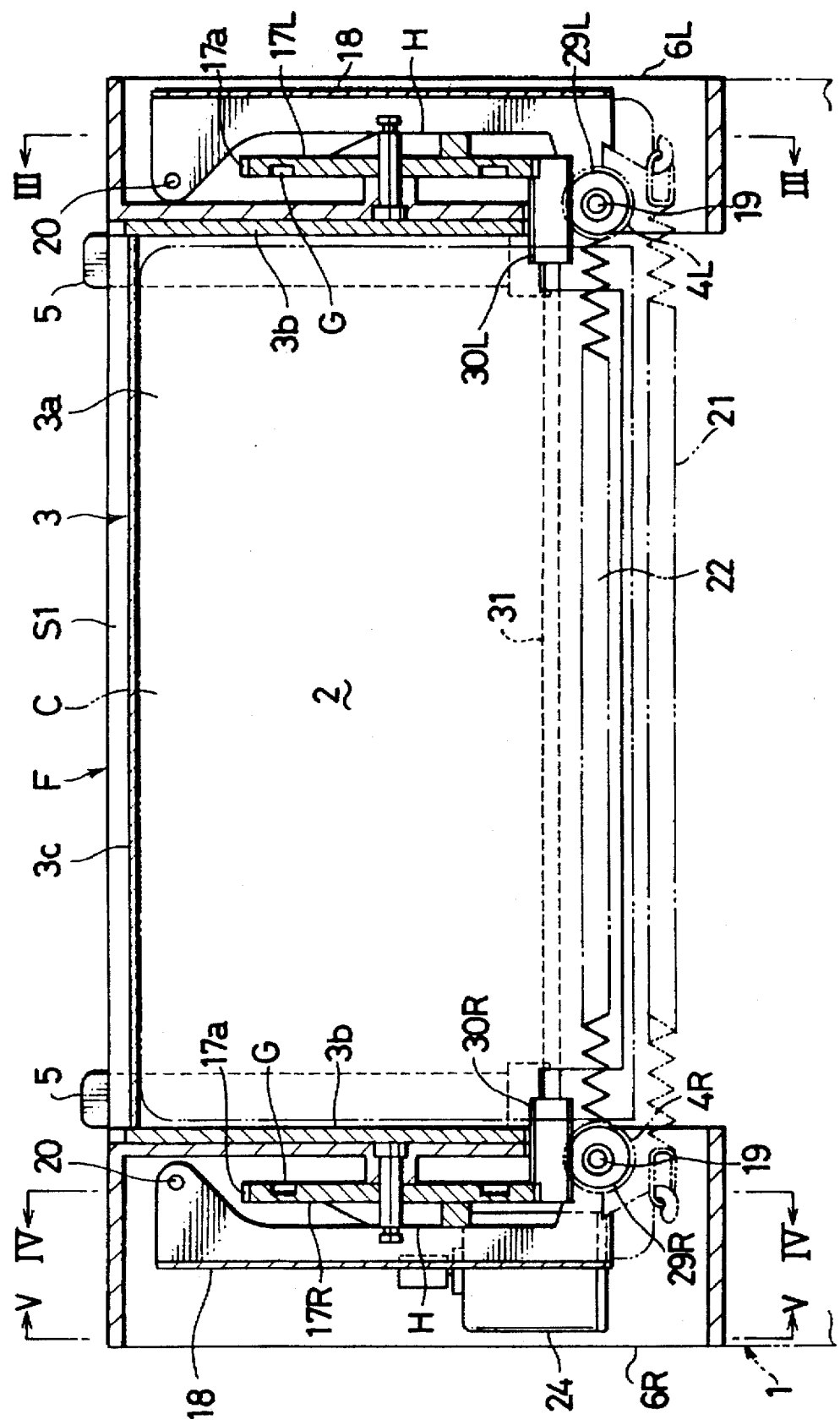
FIG. 2 is a top plan view showing the cassette changer, a top portion being cut away.

The cassette changer 2 includes a changer frame F. As shown in FIGS. 1 to 3, the changer frame F comprises left and right frames 6L, 6R, a front stay S1 arranged between front end portions of the side frames 6L, 6R, and upper and lower rear stays S2, S3 each arranged between rear end portions of the side frames 6L, 6R.

The changer frame F is incorporated with:

(I) the cassette holding portion 3 vertically movable between an uppermost position corresponding to the stand-by position of the cassette and a lowermost position corresponding to the insertion position of the cassette;

(II) a vertical moving mechanism for vertically shifting the cassette holding portion 3 between the uppermost position and the lowermost position;

(III) the pair of moving rollers 4 including left and right moving rollers 4L, 4R for inserting and discharging the cassette by rotating the rollers forward and backward in a state that the cassette is gripped therebetween;

(IV) a roller shifting mechanism for shifting the rollers 4L, 4R between an inoperative position where the rollers are retracted from a space where the cassette holding portion 3 is moved upward and downward to prevent the rollers 4L, 4R from interfering with the upward and downward movement of the cassette holding portion 3 carrying the cassette and an operative position where the rollers 4L, 4R come into contact with left and right sides of the cassette;

(V) a drive mechanism for rotating the moving rollers 4L, 4R forward and backward and for driving the vertical moving mechanism and the roller shifting mechanism; and (VI) the pair of left and right cassette receivers 5, 5 for receiving the processed cassette which is discharged outside the VTR.

The construction of each part is described in detail hereafter.

(i) Cassette Holding Portion 3 and Vertical Moving Mechanism

The cassette holding portion 3 includes a bottom wall 3a on which the cassette C is to be placed, side walls 3b, 3b formed at left and right sides thereof, and a front wall 3c.

Figure 4:
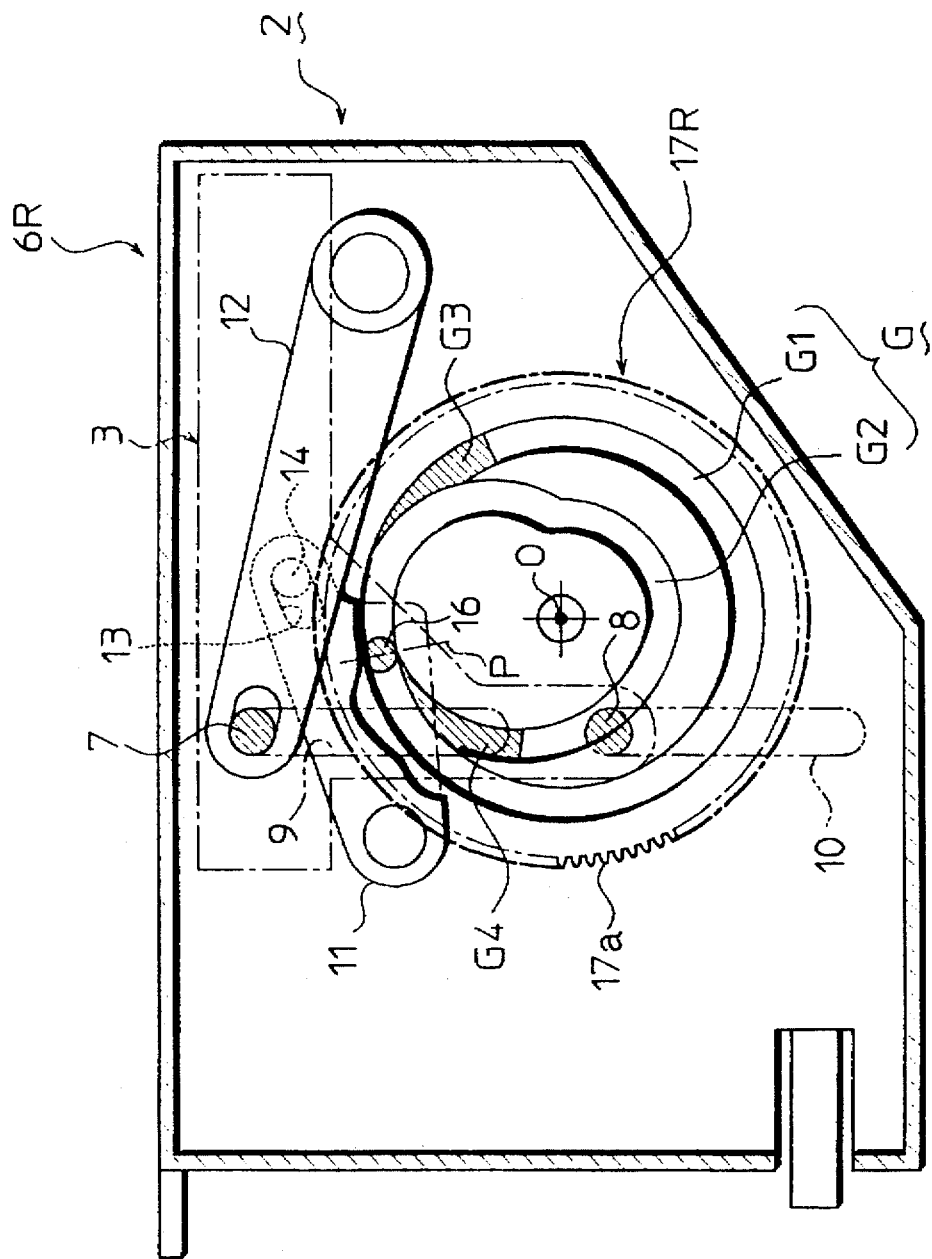
FIG. 4 is an enlarged cross sectional view taken along the line IV—IV in FIG. 2.
Figure 6:
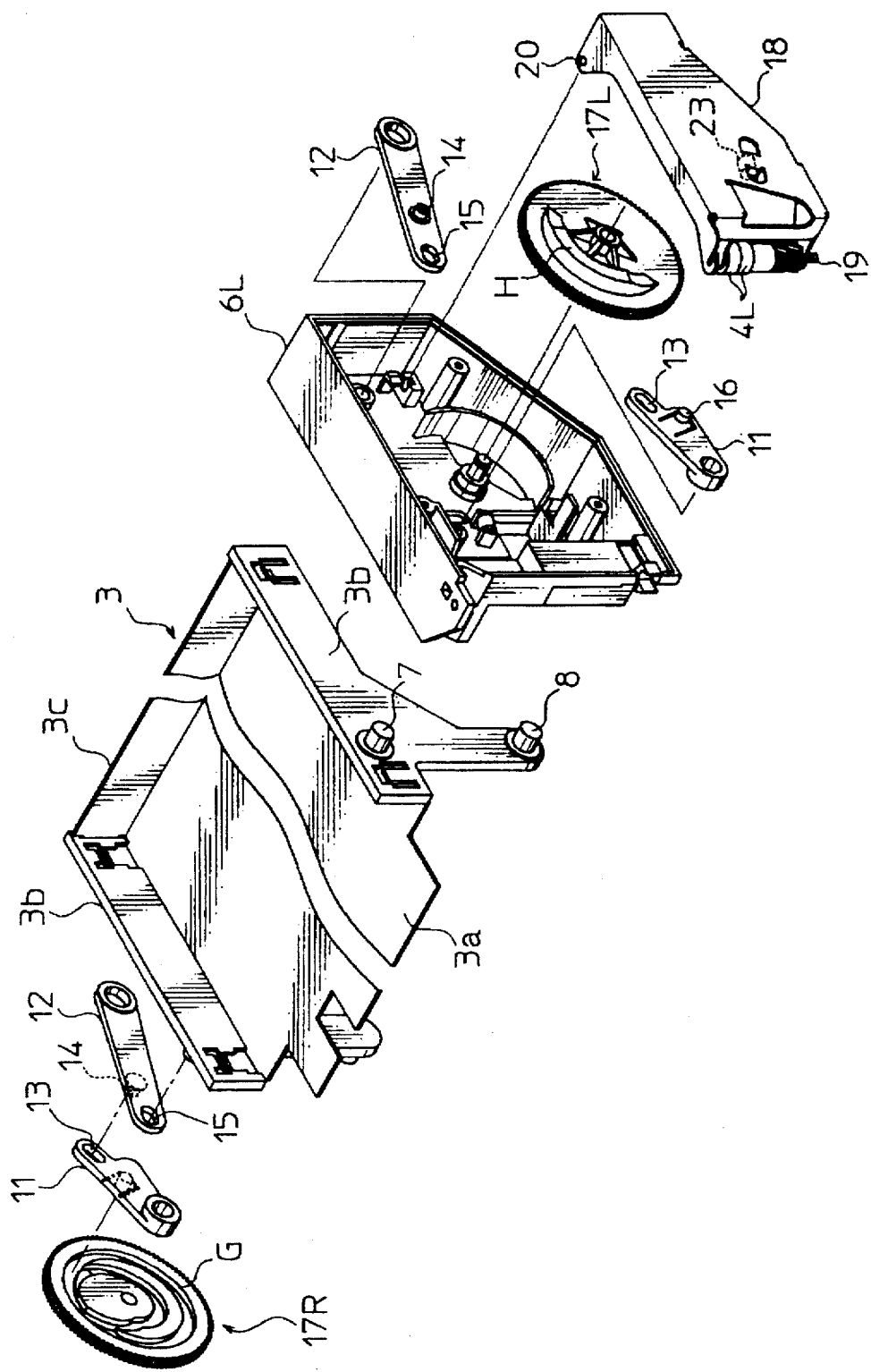
FIG. 6 is a perspective view fragmentarily showing a vertical moving mechanism and roller shifting mechanism of the cassette changer.

As shown in FIGS. 3, 4, and 6, the cassette holding portion 3 is arranged with upper and lower short restricting pins 7, 8 on a rear end portion, i.e., near the VTR 1, of the side walls 3b, 3b, respectively. The pins 7, 8 are projected outward horizontally and fitted through upper and lower guide holes 9, 10 of the side frame 6L (6R) to be movable in a vertical direction, respectively. The guide holes 9, 10 formed in the side frames 6L (6R) of the changer frame F extend vertically by a specified length in such a manner that the guide hole 9 (10) on the side frame 6L is opposed to the guide hole 9 (10) on the side frame 6R.

The side frame 6L (6R) is arranged with first and second pivotal arm members 11, 12.

The first arm member 11 is pivotally supported on a horizontal shaft in a rear end portion of the side frame 6L (6R), while the second arm member 12 is pivotally supported on a horizontal shaft in a front end portion of the side frame 6L (6R). The first and second arm members 11, 12 are coupled to each other by fitting a projection 14 formed on the second arm member 12 through an oblong hole 13 formed in the first arm member 11 at a position away from the respective pivots. Accordingly, the first and second arm members 11, 12 rotate in the same direction at the same The second arm member 12 is formed with an oblong hole 15 in the other end opposite to the horizontal shaft thereof. The upper pin 7 arranged on the side wall 3b and passed through the upper guide hole 9 of the side frame 6L (6R) is fitted through the oblong hole 15.

On the other hand, the first arm member 11 is formed with a cam pin 16 at an intermediate portion thereof. The cam pin 16 is engageably moved along a cam groove G formed in a disc-like cam disc 17L (17R) The cam disc 17L (17R) is rotatably supported on a horizontal shaft formed on the side frame 6L (6R).

Figure 7:
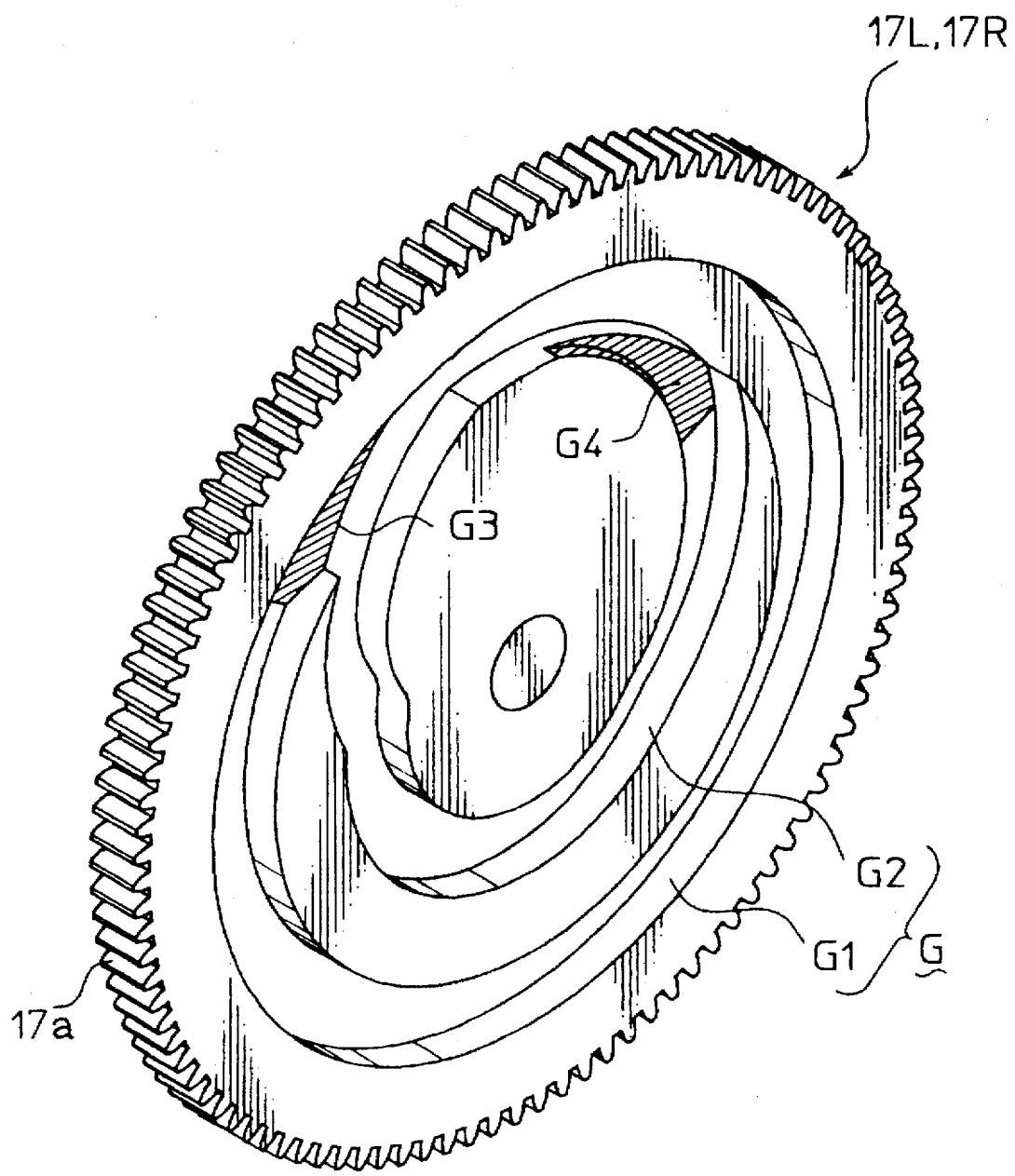
FIG. 7 is an enlarged perspective view of a cam commonly used in the vertical moving mechanism and the roller shifting mechanism.

As shown in FIGS. 4 and 7, the cam groove G is a recess formed in an inside surface of the cam disc 17L (17R). The cam groove G includes an outer circular groove G1 formed along a circle whose center is at a center 0 of the cam disc 17L (17R) and an inner groove G2 formed along a substantial ellipse whose center is shifted from the center 0 of the cam disc 17L (17R).

The cam pin 16 is located at a starting point P in the outer groove G1 before the cassette is inserted and moves in the following manner (A) and (B).

(A) at the time of inserting the cassette, the cam pin 16 starts from the starting point P, enters in the inner groove G2 and makes one turn along the inner groove G2 during one turn of the cam disc 17L (17R) in the forward direction. Then, the cam pin 16 is returned to the starting point P.

(B) at the time of discharging the cassette, the cam pin 16 makes one turn along the outer groove G1 during one turn of the cam disc 17L (17R) in the reverse direction.

With the above-mentioned movements (A) and (B) of the cam disc 17L (17R), the first arm member 11 is:

(a) pivotally shifted from an upper limit position to a lower limit position, and then, from the lower limit position to the upper limit position at insertion of the cassette; and (b) retained at the upper limit position at discharge of the cassette.

The movement of the first arm member 11 is boosted by the second arm member 12 and transmitted to the cassette holding portion 3 in a boosted manner. Consequently, the cassette holding portion 3 is shifted from the uppermost position to the lowermost position, and then from the lowermost position to the uppermost position at the time of inserting the cassette, and is retained at the uppermost position after insertion of the cassette.

At a joining portion where the inner groove G2 and the outer groove G1 join each other are formed a first restricting portion G3 and a second restricting portion G4. The first restricting portion G3 guides the cam pin 16 from the starting point P to the inner groove G2 at an initial stage of the forward one turn of the cam disc 17L (17R) (at the time of inserting the cassette). The second restricting portion G4 prevents the cam pin 16 at the starting point P from coming into the inner groove G2 at an initial stage of the reverse one turn of the cam disc 17L (17R) (at the time of discharging the cassette). These first and second restricting portions G3, G4 are represented by hatched lines in FIGS. 4 and 7.

The first and second restricting portions G3, G4 are respectively formed with a slope which permits the cam pin 16 to be moved only in one direction to thereby properly regulate the moving direction of the cam pin 16.

(ii) Moving Rollers 4L, 4R and Roller Shifting Mechanism

The moving rollers 4L, 4R are rotatably supported on roller shafts 19, 19, respectively. The roller shaft 19 is arranged upright at a rear end of a roller support arm 18. The roller support arms 18, 18 are adapted for changing over the position of the moving rollers 4L, 4R.

Figure 5:
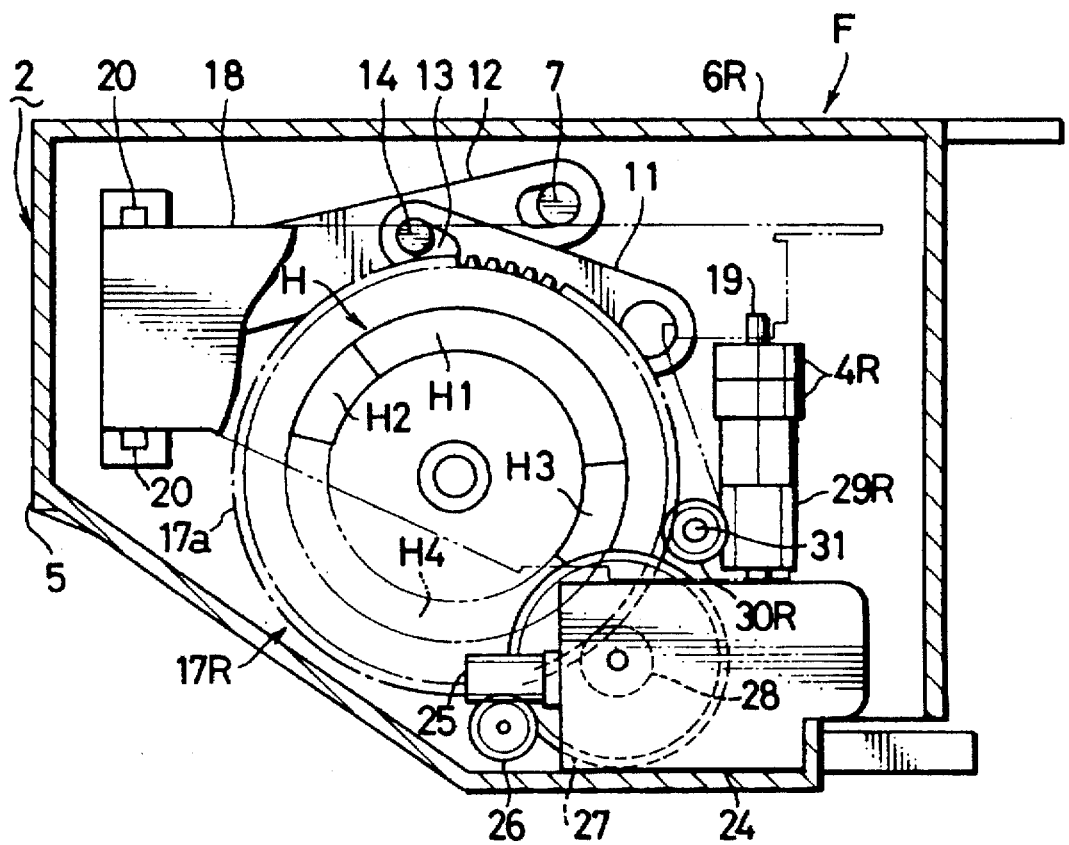
FIG. 5 is an enlarged cross sectional view taken along the line V—V in FIG. 2.

As shown in FIGS. 2, 5, and 6, the roller support arms 18, 18 are mounted to the changer frame F in such a manner that their respective front end portions can swing in left and right directions about vertical shafts 20 with respect to the side frames 6L, 6R of the changer frame F. Since the roller support arms 18, 18 are swung in this way, the moving rollers 4L, 4R can shift between:

a) the inoperative position where the rollers 4L, 4R are retracted from the movement zone where the cassette holding portion 3 is moved upward and downward so as not to come into contact with the left and right sides of the cassette and interfere with the cassette holding portion 3; and b) the operative position where the moving rollers 4L, 4R come in the movement zone and come into contact with the left and right sides of the cassette.

In this embodiment, the moving roller 4L (4R) consists of two rollers vertically arranged on the roller shaft 19. However, the moving roller 4L (4R) may be made of a single roller.

As shown in FIG. 2, helical springs (hereinafter referred to as "roller springs") 21, 22 are provided between the roller support arms 18, 18. Specifically, the roller spring 21 is stretched between the rear ends of the roller support arms 18, 18. The roller spring 22 is stretched between the roller shafts 19, 19. The roller springs 2 i, 22 serve as urging means for urging the roller support arms 18, 18 to come toward each other, in other words, into the operative position.

A cam roller 23 is rotatably supported at a rear portion of the roller support arm 18. Specifically, the cam roller 23 is mounted on a shaft which is inclined with respect to a lengthwise direction of the roller support arm 18. The cam roller 23 comes into contact with a cam way H (shown in FIGS. 3, 5, and 6) formed on an outer side surface of the cam disc 17L (17R) or a surface of the side opposite to the side where the cam groove G is formed. The cam roller 23 is moved along the cam way H.

The cam way H consists of a rise portion H1, a first slope H2, a second slope H3, and a ground portion H4 connecting with the first and second slopes H2, H3. The rise portion H1 is formed in a half section (less than 180 degrees) of a specified circle having the center point 0. The first and second slopes H2, H3 respectively connect with opposite ends of the rise portion H1. The ground portion H4 is defined in the other section of the circle.

The cam roller 23 is moved as follows.

Before changing the cassette, the cam roller 23 is located at one end of the rise portion H1 (i.e., starting point Q).

When the cam disc 17L (17R) makes one turn in the forward direction at the time of cassette insertion, the cam roller 23 moves from H1→H2→H4→H3→H1, and returns to the starting point Q. On the other hand, when the cam disc 17L (17R) makes one turn in the reverse direction at the time of cassette discharge, the cam roller 23 moves from H1→H3→H4→H2→H1.

As the cam rollers 23, 23 of the left and right roller support arms 18, 18 move over the cam ways H, H of the left and right cam discs 17L and 17R against the urging force of the roller springs 21, 22, the left and right roller support arms 18, 18 swing in the left and right directions of the changer frame F to shift the moving rollers 4L, 4R between the inoperative position and operative position.

(iii) Drive Mechanism

As shown in FIGS. 2 and 5, a drive motor 24 as a drive source is arranged at the right frame 6R of the changer frame F.

The right frame 6R is also arranged with a worm gear 25 mounted on a drive shaft of the motor 24, a worm wheel gear 26, a decelerating spur gear 27, and a cam drive spur gear 28. The cam drive gear 28 is meshed with a cam gear 17a formed around an outer circumference of the right cam disc 17R.

With this construction, the rotational force of the drive motor 24 is transmitted to the right cam disc 17R through the worm gear 25→worm wheel gear 26→decelerating gear 27→drive gear 28→cam gear 17a to thereby rotate the right cam disc 17R in the specified direction.

The right frame 6P, is arranged with a roller gear 29R below the moving roller 4R to be rotatable about the roller shaft 19. The roller gear 29R is meshed and rotatable together with the cam gear 17a via an idler gear 30R.

On the other hand, as shown in FIGS. 2 and 3, the left frame 6L is arranged with a roller gear 29L and an idler gear 30L each corresponding to the roller gear 29R and idler gear 30R of the right frame 6R. Similar to the construction of the right frame 17R, the roller gear 29L is meshed and rotatable together with a cam gear 17a of the left cam disc 17L via the idler gear 30L.

The idler gears 30L, 30R are connected with each other by a connecting rod 31 to be rotatable together.

With this construction, the rotational force of the cam disc 17R is transmitted to the roller gear 29R and to the moving roller 4R via the idler gear 30R, and at the same time, is transmitted to the moving roller 4L and the cam disc 17L via the idler gear 30R, connecting rod 31, idler gear 30L and roller gear 29L. In this way. the moving roller 4L and the cam disc 17L are rotated in synchronism with the moving roller 4R and the cam disc 17R in the same direction.

As shown in FIG. 3, the cassette receivers 5, 5 are mounted to the side frames 6L, 6R of the changer frame F in such a manner that the cassette receivers 5, 5 are pivotally rotatable about a horizontal shaft arranged at a rear end of the side frames.

The cassette receiver 5 is arranged with an urging spring 5a at a pivot pin about which the cassette receiver is pivotally rotated. With the urging force of the springs 5a, 5a, the cassette receivers 5,5 are kept in a forwardly upward posture before the cassette is discharged. The cassette receivers 5, 5 are rotated downward with the weight of the discharged cassette, thereby being shifted to a substantially horizontal posture.

The operation of the cassette changer is described in detail with reference to FIGS. 9 to 12.

FIGS. 9A to 9I are diagrams showing sequential movements of the cassette holding portion 3 and the vertical moving mechanism at the time of insertion of the cassette, and FIGS. 10A to 10I are diagrams showing sequential movements of the roller shifting mechanism in association with the movement of the vertical moving mechanism.

It should be appreciated that "uppermost position", "lowermost position", "being moved downward", and "being moved upward" in FIGS. 9A to 9I indicate respective movement states of the cassette holding portion 3, and "open state" and "close state" in FIGS. 10A to 10I indicate respective movement states of the roller support arms 18, 18. The moving rollers 4L and 4R are, in the open state, shifted to the inoperative position, while in the close state, shifted to the operative position.

A. Insertion of the Cassette (see FIGS. 9A to 10I)

Figure 9A:
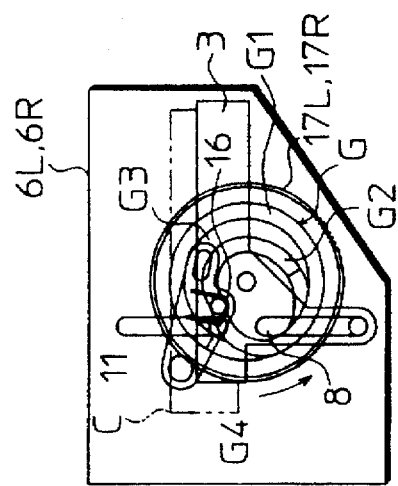
FIGS. 9A to 9I are diagrams of the vertical moving mechanism, FIG. 9A showing a state in which a cassette holding portion is at an uppermost position before a cassette is inserted, FIG. 9B showing a state in which the cassette holding portion carrying a cassette is being moved downward to insert the cassette, FIGS. 9C, 9D, 9E, and 9F respectively showing states in which the cassette holding portion is shifted to a lowermost position, and FIGS. 9G to 9I respectively showing states that the cassette holding portion is started to move upward from the lowermost position, has being moved upward, and has reached the uppermost position.

In the state shown in FIG. 9A, a new cassette C is housed in the cassette holding portion 3. When the drive motor 24 is driven by an unillustrated switch to start, the cam discs 17L, 17R are rotated in the forward direction shown by the arrow in FIG. 9B.

Figure 9B:
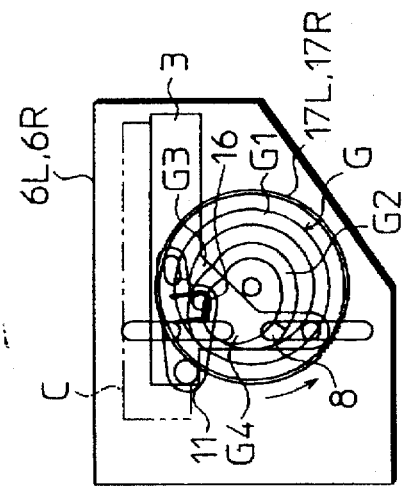
Figure 9C:
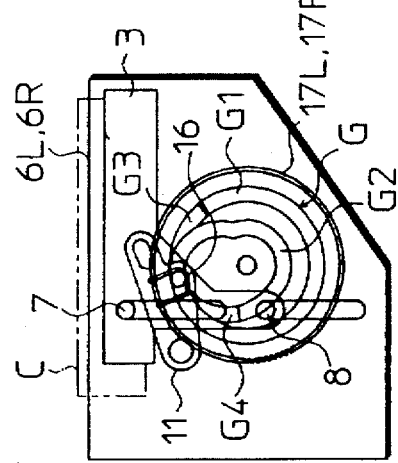

Then, the cam pin 16 at the starting point P as shown in FIG. 4 enters the inner groove G2 as shown in FIG. 9B and moved therealong to pivotally rotate the first and second arm members 11, 12 downward, Together with the pivotal rotation of the first and second arm members 11, 12, the cassette holding portion 3 is moved downward as shown in FIG. 9C to shift the cassette C to the cassette insertion position.

Figure 9D:
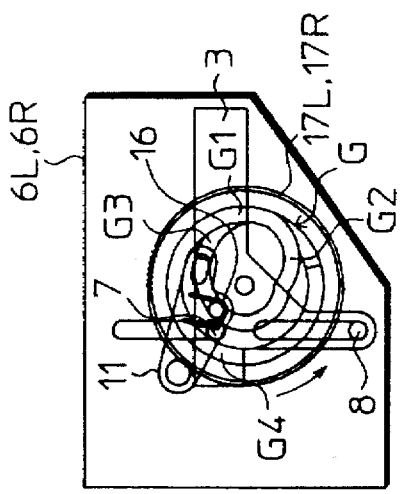
Figure 9E:
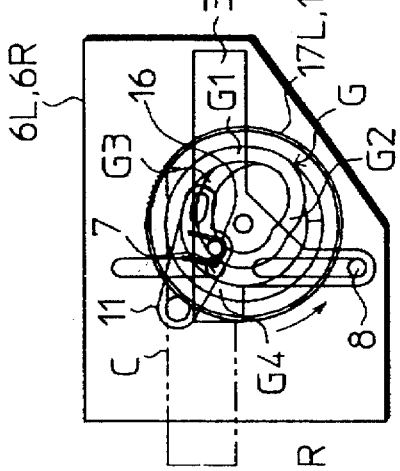
Figure 9F:
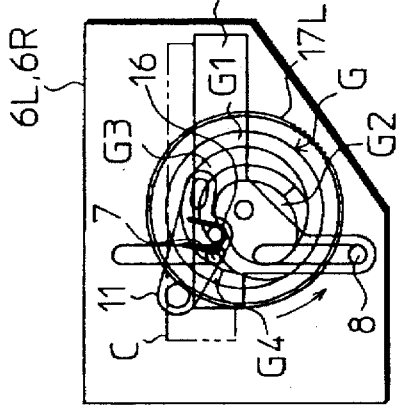
Figure 9G:
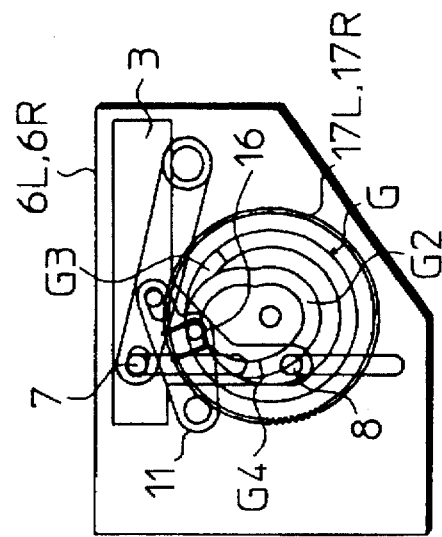
Figure 9H:
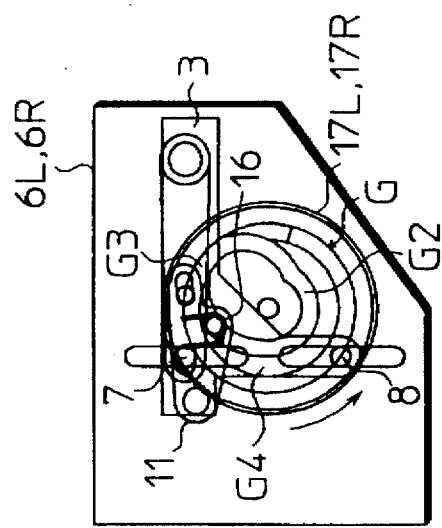
Figure 9I:
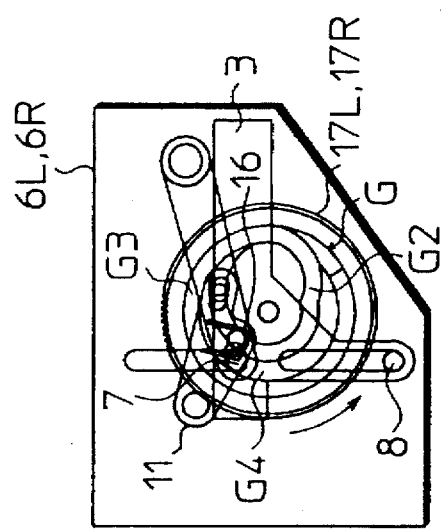

The cassette holding portion 3 is retained at the lowermost position during the rotation of the cam discs 17L, 17R at about 180 degrees as shown in FIGS. 9D to 9F. Thereafter, as shown in FIGS. 9G to 9I, the cassette holding portion 3 is returned to the uppermost position by the rotation of the cam discs 17L, 17P, at about 90 degrees.

On the other hand, after the cam disc 17L (17R) is rotated in the forward direction, the cam roller 23 of the roller support arm 18 comes into contact with the rise portion H1 of the cam way H during the rotation of the cam disc 17L (17R) in the forward direction at 180 degrees or more as shown in FIGS. 10A to 10C.

The roller support arms 18, 18 are kept in the open state until the cassette holding portion 3 reaches the lowermost position to keep the moving rollers 4L, 4R at the inoperative position where the rollers 4L, 4R. do not interfere with the downward movement of the cassette holding portion 3.

After the cassette holding portion 3 is moved downward to the lowermost position, as shown in FIG. 10D, the roller support arms 18, 18 are swung closer to each other upon the cam rollers 23, 23 reaching their corresponding first slopes H2, H2. Then, as shown in FIGS. 10E, 10F, and 10G, the roller support arms 18, 18 are kept in the close state while the cam rollers 23, 23 are moved along the ground portion H4 at 90 degrees or less.

Consequently, the moving rollers 4L, 4R are shifted to the operative position and come into contact with the left and right sides of the cassette C. With the forward rotation of the moving rollers 4L, 4R, the cassette C is inserted in the VTR 1 through the cassette inlet-outlet opening 1a and transported to the recording-reproduction position by the loading mechanism within the VTR 1.

Figure 12:
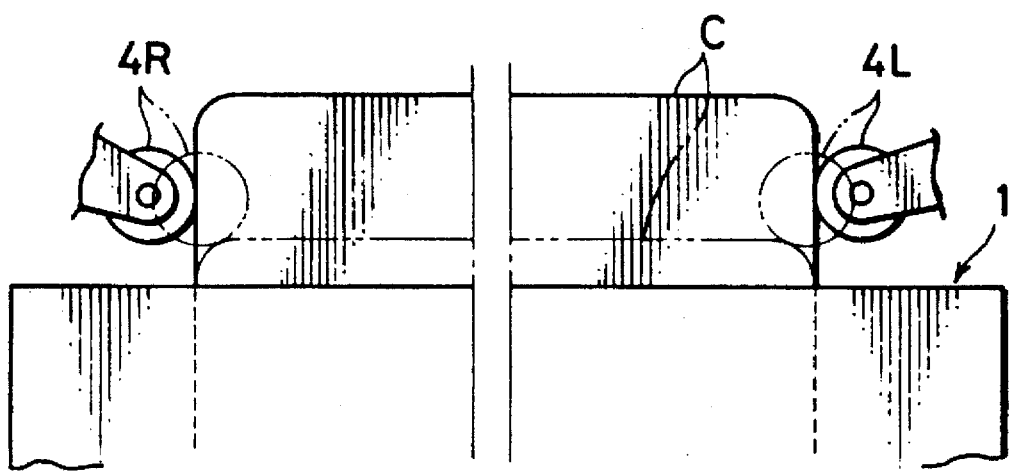
FIG. 12 is a diagram showing an operation of pushing the cassette further rearward by moving rollers in a final step of the insertion of the cassette.

At the final stage of the insertion of the cassette, as shown in FIG. 12, immediately before leaving the cassette C, the moving rollers 4L, 4R make a further push to the cassette C by being slidably shifted from the left and right sides of the cassette to the rear side of the cassette. Accordingly, the cassette C can be more reliably loaded in the loading mechanism.

After the insertion of the cassette, as shown in FIGS. 10H and 10I, the cam rollers 23, 23 are moved along the second slopes H3, H3 and returned to the one end (i.e., starting point Q in FIG. 3) of the rise portions H1, HI. Thereby, the roller support arms t8, 18 are shifted to the open state, and the moving rollers 4L, 4R are returned to the inoperative position.

In this way, with the one turn of the cam discs 17L, 17R in the forward direction, the cassette is automatically inserted in the VTR.

In this embodiment, as shown in FIGS. 10A to 10I, there is provided a cam switch 32 facing the circumference of one of the left and right cam discs 17L and 17R. On the other hand, the corresponding cam disc 17L or 17R is provided with a contact member 33 operative to come into contact with the cam switch 32. After the one turn of the cam disc 17L (17R), the contact member 33 comes into contact with the cam switch 32 and then operates the cam switch to stop the drive motor 24.

B. Discharge of the Cassette (see FIGS. 11A to 11F)

Upon the processed cassette C being ejected after recording or reproduction, an unillustrated eject verifier switch is operated to start the drive motor 24 to rotate in the reverse direction.

During the reverse rotation of the motor 24, the cassette holding portion 3 is kept at the uppermost position since the cam pin 16 of the vertical moving mechanism is moved along the outer groove G1 of the cam groove G during the reverse rotation of the motor 24.

On the other hand, in the roller shifting mechanism, as shown in FIGS. 11A to 11D, the cam rollers 23, 23 are moved from H1→H3→H4 with the reverse rotation of the cam discs 17L, 17R. Thereby, the roller support arms 18, 18 swing to the closed state to shift the moving rollers 4L, 4R to the operative position. When the moving rollers 4L, 4R come into contact with the left and right sides of the cassette C at the operative position, and have their rotating direction reversed, the cassette C is ejected and discharged from the VTR I through the cassette inlet-outlet opening 1a. The thus discharged cassette C falls by its weight and is received upon the cassette receivers 5, 5.

After the discharge of the cassette C, as shown in FIGS. 11E and 11F, the cam rollers 23, 23 are moved from the first slopes H2, H2 to the rise portions H1, H1. Consequently, the roller support arms 18, 18 swing to the open state, and the cam discs 17L, 17R make one turn in the reverse direction. Then, the cam switch 32 is actuated to stop the drive motor 24.

In the foregoing embodiment, the upward and downward movement of the cassette holding portion 3, forward and backward rotation of the moving rollers 4L, 4R, shifting operation of the moving rollers 4L, 4R between the inoperative position and operative position (the swinging of the roller support arms 18, 18) are performed with use of the only one drive source, i.e., the drive motor 24. However, these three operations may be performed individually using three different drive sources. Alternatively, two of the three operations may be performed by one motor, while the other one of the three operations may be performed by another motor.

Figure 13:
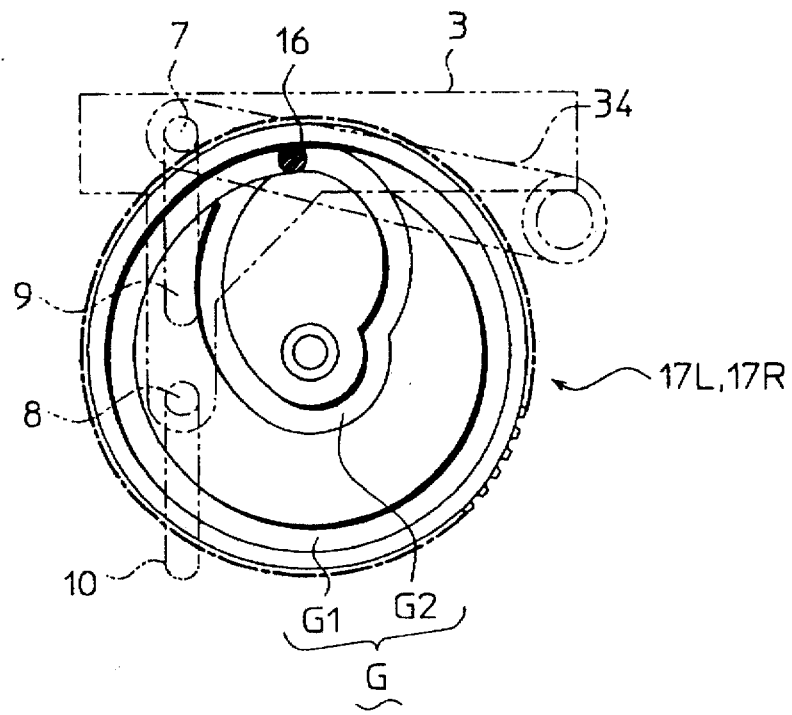
FIG. 13 is a side view showing a vertical moving mechanism of another cassette changer of the present invention.

Further, in the foregoing embodiment, the first and second arm members 11, 12 are coupled to each other to move the cassette holding portion 3 upward and downward in the vertical moving mechanism. However, as shown in FIG. 13, it may be appreciated to use a single arm member 34 instead of the two arm members 11 and 12 to move the cassette holding portion 3 upward and downward.

Figure 14:
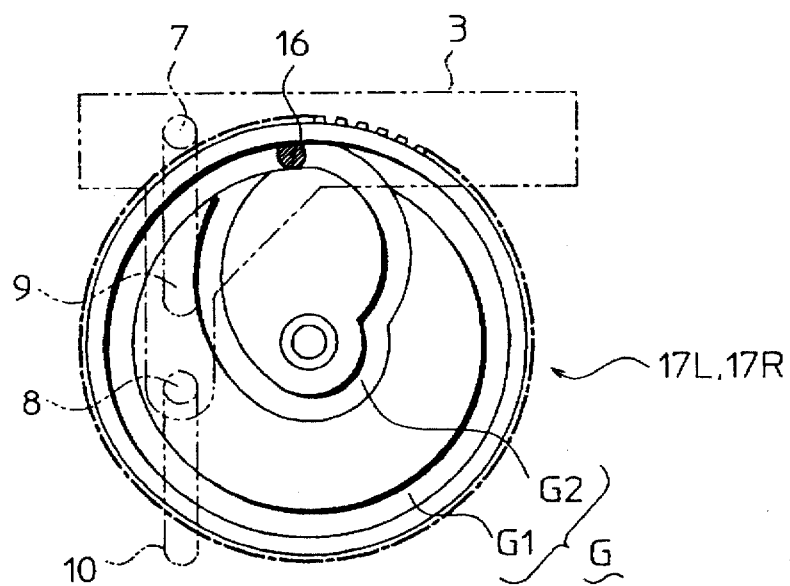
FIG. 14 is a side view showing a vertical moving mechanism of still another cassette changer of the present invention.

Alternatively, as shown in FIG. 14, the cam pin 16 may be directly mounted on the cassette holding portion 3 without the provision of arm members to move the cassette holding portion 3 upward and downward directly with the movement of the cam discs 17L, 17R.

Figure 15:
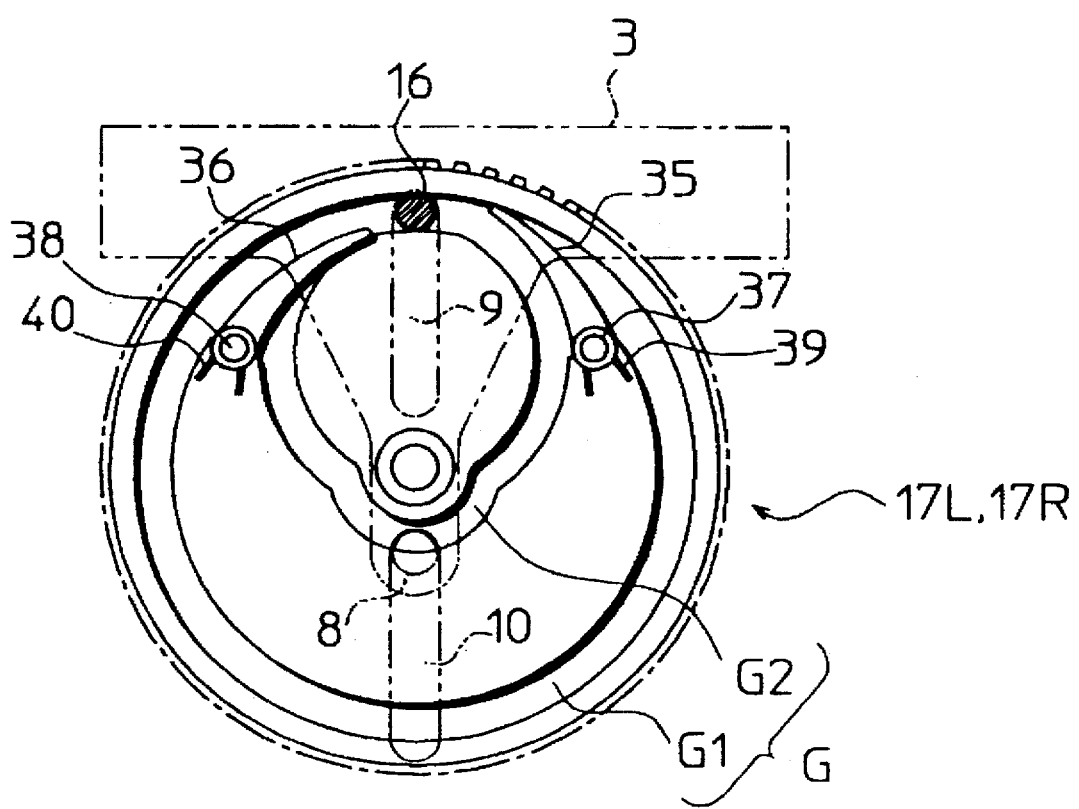
FIG. 15 is a side view showing a vertical moving mechanism of yet still another cassette changer of the present invention.

In this case, further, it may be appreciated to adopt an arrangement to allow the cam pin 16 to move on a vertical plane passing the center 0 of the cam disc 17L (I 7R). This arrangement accompanies the advantage that a symmetrical cam groove G can be formed as shown in FIG. 15. The fact that a symmetrical cam groove can be formed will remarkably reduce the production costs because it is not necessary to produce left cam discs and right cam discs separately but a single type of cam discs can be commonly used for both sides.

Further, in this case, it may be possible to make the cam pin 16 serve as a restricting pin by arranging upper and lower guide holes 9, 10 on the vertical plane passing the center 0 of the cam disc.

In the foregoing embodiment, the first and second restricting portions G3, G4 are formed in the joining portions between the outer groove G1 and the inner groove G2 to move the cam pin 16 in the opposite directions corresponding to the opposite rotations of the cam discs 17L, 17R, i.e., the forward direction and the backward direction. However, as shown in FIG. 15, it may be appreciated to provide first and second restricting members 35, 36 in the joining portions instead of the first and second restricting portions G3, G4.

The first and second restricting members 35, 36 are pivotally supported on pins 37, 38 at lower ends of the joining portions. The first restricting member 35 is urged in such a direction as to close the outer groove G1 by a spring 39 mounted on the pin 37. The second restricting member 36 is urged in such a direction as to close the inner groove G2 by a spring 39 mounted on the pin 38. In this way, the movement of the cam pin 16 can be regulated in the similar manner to the foregoing embodiment.

Further, to shift a new cassette between the stand-by position above the cassette inlet-outlet opening and the insertion position facing the opening, it may be appreciated to adopt a shifting mechanism including a separator pivotable about a horizontal shaft extending in sideways of a cassette changer for supporting a new cassette, as shown in U.S. Pat. No. 5,128,816 filed by the inventor of the present invention. The separator is shiftable between a horizontal posture where the separator is at a cassette insertion position facing the cassette inlet-outlet opening when a new cassette is placed and a slanting posture when the cassette is not placed.

Furthermore, in the foregoing embodiment, the moving rollers 4L, 4R are shifted between the inoperative position and the operative position by the swing operation (change over of open and close states) of the roller support arms 18, 18. Alternatively, the moving rollers 4L, 4R are shifted linearly between the inoperative position and the operative position.

Moreover, in the foregoing embodiment, a new cassette is placed on the cassette holding portion 3 one by one to change a processed cassette with a new cassette. Alternatively, a plurality of new cassettes may be stacked on the cassette holding portion 3 (or the separator in the shifting mechanism of U.S. Pat. No. 5,128,816), and the thus stacked new cassettes are shifted to the cassette insertion position one after another from the lowermost cassette each time a processed cassette is discharged.

Although the present invention has been fully described by way of example with reference to the accompanying drawings, it is to be understood that various changes and modifications will be apparent to those skilled in the art. Therefore, unless otherwise such changes and modifications depart from the scope of the present invention, they should be construed as being included therein.

What is claimed is:

1. A cassette changer mountable on a magnetic recording-reproduction apparatus, the magnetic recording-reproduction apparatus having a cassette inlet-outlet opening, the cassette changer comprising:

a cassette shifter which shifts a new cassette from a stand-by position above the cassette inlet-outlet opening to an insertion position facing the cassette inlet-outlet opening;

the cassette shifter including:

a cassette holder which holds a new cassette; and a vertical moving mechanism which moves the cassette holder between an upper position corresponding to the stand-by position and a lower position corresponding to the insertion position;

the vertical moving mechanism including:

a cassette holder moving cam rotatable about a cam axis; and a vertical movement converter which is cooperatively connected with the cassette holder moving cam and the cassette holder to convert a rotational force of the cassette holder moving cam to a force for moving the cassette holder in the vertical direction;

the cassette holder moving cam being formed in such a manner as to move the cassette holder from the upper position to the lower position and to the upper position again during one turn in the forward direction while maintaining the cassette changer at the upper position during one turn in the backward direction;

a cassette mover which inserts and withdraws a cassette into and from the magnetic recording-reproduction apparatus through the cassette inlet-outlet opening, the cassette mover including:

at least one roller on each side of the cassette;

a roller shifter which shifts the rollers between:

an operative position to come into contact with the sides of the cassette to insert and withdraw the cassette, and an inoperative position disposed away from the sides of the cassette to allow the cassette to be shifted by the cassette shifter; and a roller driver which drives the rollers in forward and backward directions to insert and withdraw the cassette;

the roller shifter including:

a roller shifting cam rotatable about said cam axis;

a roller shifting converter which is cooperatively connected with the roller shifting cam and the rollers to convert a rotational force of the roller shifting cam to a force for shifting the rollers from the operative position to the inoperative position; and an urging device which urges the rollers to the operative position;

the cassette holder moving cam and the roller shifting cam being formed into one body;

the roller shifting cam being formed in such a manner as to shift the rollers from the inoperative position to the operative position and to the inoperative position again during one turn in the forward direction and the backward direction.

2. A cassette changer as defined in claim 1, wherein:

the vertical movement converter includes a cam follower portion;

the cassette holder moving cam includes:

an outer circular groove which is operable to relatively move the cam follower portion and is formed along a circle whose center is at said cam axis;

an inner groove which is operable to relatively move the cam follower portion and is formed along a substantial ellipse which is positioned in the circle and whose center is shifted from said cam axis, the inner groove partially joining the outer circular groove; and restricting means provided in the joining portion for restricting the relative movement of the cam follower portion:

in a route which advances from the outer groove to the inner groove and to the outer groove again during one turn in the forward direction; and in a route which advances the outer groove during one turn in the backward direction.

3. A cassette changer as defined in claim 1, wherein the vertical movement converter includes:

a first arm member cooperatively connected with the cassette holder moving cam, the first arm member being rotated on a vertical plane by the cassette holder moving cam; and a second arm member cooperatively connected with the cassette holder and the first arm member, the second arm member being rotated on a vertical plane by the first arm member to thereby move the cassette holder up and down.

4. A cassette changer mountable on a magnetic recording-reproduction apparatus, the magnetic recording-reproduction apparatus having a cassette inlet-outlet opening, the cassette changer comprising:

a cassette shifter which shifts a new cassette from a stand-by position above the cassette inlet-outlet opening to an insertion position facing the cassette inlet-outlet opening;

the cassette shifter including:

a cassette holder which holds a new cassette; and a vertical moving mechanism which moves the cassette holder between an upper position corresponding to the stand-by position and a lower position corresponding to the insertion position, the vertical moving mechanism including a cassette holder moving cam rotatable about a cam axis;

the cassette holder moving cam being formed in such a manner as to move the cassette holder from the upper position to the lower position and to the upper position again during one turn in the forward direction, while maintaining the cassette changer at the upper position during one turn in the reverse direction;

a cassette which inserts and withdraws a cassette into and from the magnetic recording-reproduction apparatus through the cassette inlet-outlet opening, the cassette shifter including:

at least one roller on each side of the cassette;

a roller shifter which includes a roller shifting cam and which shifts the rollers between:

an operative position to come into contact with the sides of the cassette to insert and withdraw the cassette, and an inoperative position spaced from the sides of the cassette to allow the cassette to be shifted by the cassette shifter; and a roller driver which drives the rollers in forward and backward directions to insert and withdraw the cassette;

the roller shifting cam being formed in such a manner as to shift the rollers from the inoperative position to the operative position and to the inoperative position again during one turn in the forward direction and one turn in the reverse direction.

5. A cassette changer mountable on a magnetic recording-reproduction apparatus, the magnetic recording-reproduction apparatus having a cassette inlet-outlet opening, the cassette changer comprising:

a cassette shifter which shifts a new cassette from a stand-by position above the cassette inlet-outlet opening to an insertion position facing the cassette inlet-outlet opening, the cassette shifter including:

a cassette holder which holds a new cassette; and a vertical moving mechanism which includes a cassette holder moving cam and which moves the cassette holder between an upper position corresponding to the stand-by position and a lower position corresponding to the insertion position;

the cassette holder moving cam being formed in such a manner as to move the cassette holder from the upper position to the lower position and to the upper position again during one turn in the forward direction while maintaining the cassette changer at the upper position during one turn in the reverse direction;

a cassette mover which inserts and withdraws a cassette into and from the magnetic recording-reproduction apparatus through the cassette inlet-outlet opening, the cassette shifter mover including:

at least one roller on each side of the cassette;

a roller shifter which shifts the rollers between:

an operative position to come into contact with the sides of the cassette to insert and withdraw the cassette and an inoperative position disposed away from the sides of the cassette to allow the cassette to be shifted by the cassette shifter; and a roller driver which drives the rollers in forward and reverse directions to insert and withdraw the cassette.

6. A cassette changer mountable on a magnetic recording-reproduction apparatus, the magnetic recording-reproduction apparatus having a cassette inlet-outlet opening, the cassette changer comprising:

a cassette shifter which shifts a new cassette from a stand-by position above the cassette inlet-outlet opening to an insertion position facing the cassette inlet-outlet opening;

a cassette mover which inserts and withdraws a cassette into and from the magnetic recording-reproduction apparatus through the cassette inlet-outlet opening, the cassette mover including:

at least one roller on each side of the cassette;

a roller shifter which includes a roller shifting cam rotatable about a cam axis, said roller shifter shifting the rollers between:

an operative position to come into contact with the sides of the cassette to insert and withdraw the cassette, and an inoperative position spaced from the sides of the cassette to allow the cassette to be shifted by the cassette shifter; and a roller driver which drives the rollers in forward and reverse directions to insert and withdraw the cassette;

the roller shifting cam being formed in such a manner as to shift the rollers from the inoperative position to the operative position and to the inoperative position again during one turn in the forward direction and during one turn in the reverse direction.

7. A cassette changer mountable on a magnetic recording reproduction apparatus, the magnetic recording-reproduction apparatus having a cassette inlet-outlet opening, the cassette changer comprising:

a cassette mover which inserts and withdraws a cassette into and from the magnetic recording-reproduction apparatus through the cassette inlet-outlet opening, the cassette mover including:

at least one roller on each side of the cassette;

a roller shifter which shifts the rollers between:

an operative position to come into contact with the sides of the cassette to insert and withdraw the cassette, and an inoperative position disposed away from the sides of the cassette to allow the cassette to be shifted by the cassette shifter; and a roller driver which drives the rollers in forward and reverse directions to insert and withdraw the cassette;

the roller shifter including a roller shifter cam which is rotatable about a cam axis and a cam follower contacting the roller shifter cam, the roller shifter cam being in the form of a disk, a cam way on said disk, said cam way having a variable depth measured in a direction parallel to said cam axis such that engagement of said cam follower with said cam way upon rotation of said cam disk effects displacement of said cam follower along variable displaced positions measured in a direction parallel to said cam axis and corresponding to the variable depth of said cam way.

8. A cassette changer mountable on a cassette receiving apparatus, the cassette receiving apparatus having a cassette inlet-outlet opening, the cassette changer comprising:

a cassette shifter which shifts a cassette holder from a stand-by position displaced from facing the cassette inlet-outlet opening to an insertion position facing the cassette inlet-outlet opening;

said cassette shifter including a cassette holder cam operable to move the cassette holder from the stand-by position to the insertion position and to the stand-by position again during one turn in the forward direction while maintaining the cassette changer at the stand-by position during one turn in the reverse direction;

said cassette shifter including a cam follower, said cassette holder cam including two cam ways, said cam follower engaging one of said cam ways during one turn of said cam in said forward direction, said cam follower engaging the other of said cam ways during said one turn of said cam in the reverse direction; and a cassette mover which inserts and withdraws the cassette holder into and from the cassette receiving apparatus through the cassette inlet-outlet opening.

9. A cassette changer according to claim 8 wherein said cassette holder cam is rotatable about a cam axis, said cassette mover including a cassette mover cam rotatable about said cam axis, said cassette mover cam being rotatable in unison with said cassette holder cam about said cam axis, said cassette mover cam being operable to insert said cassette holder into said cassette receiving apparatus during one turn of said cassette mover cam in said forward direction, said cassette mover cam being operable to withdraw said cassette holder from said cassette receiving apparatus during one turn of said cassette mover cam in said reverse direction.

10. A cassette changer according to claim 9 wherein said cassette mover includes a second cam follower, said cassette mover cam having a cam surface engaged by said second cam follower, said second cam follower engaging said cam surface when said cassette mover cam rotates one turn in said forward direction and when said cassette mover cam rotates one turn in said reverse direction.

11. A cassette changer according to claim 8 wherein said cassette holder cam is rotatable about a cam axis, said cassette mover including a cassette mover cam rotatable about said cam axis, said cassette mover cam being rotatable in unison with said cassette holder cam about said cam axis, said cassette mover including a second cam follower contacting said cassette mover cam, said cassette mover cam being in the form of a disk, a third cam way on said disk, said third cam way having a variable thickness measured in a direction parallel to said cam axis such that engagement of said second cam follower with said third cam way upon rotation of said cam disk effects displacement of said second cam follower along variable displaced positions measured in a direction parallel to said cam axis and corresponding to the variable thickness of said second cam way.

12. A cassette changer according to claim 8 wherein said one cam way is a generally circular groove.

13. A cassette changer according to claim 8 wherein said other cam way is a non-circular groove.

14. A cassette changer according to claim 8 wherein said one cam way is disposed within an area bounded by said other cam way.

15. A cassette changer according to claim 8 wherein said one cam way is an inner cam groove and said other cam way is an outer cam way.

16. A cassette changer according to claim 15 wherein said inner and said outer cam grooves have a joining portion at which said inner and outer cam grooves are joined to one another.

17. A cassette changer according to claim 16 further comprising first restricting means at one part of said joining portion for preventing the cam follower from entering the outer cam groove at the beginning of forward rotation of said cam from a starting position, and second restriction means at another part of said joining portion for preventing the cam follower from entering the inner cam groove at the beginning of reverse rotation of said cam from said starting position.

18. A cassette changer according to claim 17 wherein said first and second restricting means are pivotal between open and closed positions, said first restricting means in said closed position closing off said outer cam groove, said second restricting means in said closed position closing off said inner cam groove.

19. A cassette changer according to claim 18 further comprising biasing means biasing said first and second restriction means in their respective closed positions.

* * * * *